(12) United States Patent
Vukelich et al.

(10) Patent No.: US 7,500,266 B1
(45) Date of Patent: Mar. 3, 2009

(54) SYSTEMS AND METHODS FOR DETECTING NETWORK INTRUSIONS

(75) Inventors: Daniel Francis Vukelich, Nashua, NH (US); John Houston Lowry, Pepperell, MA (US); Derrick Kong, Somerville, MA (US); Wilson Wrenshall Farrell, Jr., Lexington, MA (US); Kenneth Burton Theriault, Lexington, MA (US)

(73) Assignees: BBN Technologies Corp., Cambridge, MA (US); Verizon Corporate Services Group, Inc., New York, NY (US)

( * ) Notice: Subject to any disclaimer, the term of this patent is extended or adjusted under 35 U.S.C. 154(b) by 656 days.

(21) Appl. No.: 10/308,683

(22) Filed: Dec. 3, 2002

(51) Int. Cl.
*G06F 15/18* (2006.01)
*G08B 23/00* (2006.01)

(52) U.S. Cl. ...................................... 726/23

(58) Field of Classification Search .................. None
See application file for complete search history.

(56) References Cited

U.S. PATENT DOCUMENTS

| | | | | |
|---|---|---|---|---|
| 6,321,338 | B1* | 11/2001 | Porras et al. | 726/25 |
| 6,907,430 | B2* | 6/2005 | Chong et al. | 707/100 |
| 2003/0105976 | A1* | 6/2003 | Copeland, III | 713/201 |
| 2003/0167402 | A1* | 9/2003 | Stolfo et al. | 713/200 |

OTHER PUBLICATIONS

Leckie et al. A Probabilistic Approach to Detecting Network Scans Network Operations and Managment Symposium 2002 IEEE/IFIP Apr. 15-19, 2002 pp. 359-372.*

Eleazar Eskin Anomaly Detection over Noisy Data using Learned Probability Distributions Proc. 17th International Conf. on Machine Learning 2000 Morgan Kaufmann, San Francisco, {CA} pp. 255-262 citeseer.ist.psu.edu/eskin00anomaly.html.*

L. Portnoy et al. Intrusion detection with unlabeled data using clustering In ACM Workshop on Data Mining Applied to Security DMSA 2001 citeseer.ist.psu.edu/portnoy01intrusion.html.*

Nmap ("Network Mapper"); http://www.insecure.org/nmap; Nov. 12, 2001; print date Jun. 24, 2002; pp. 1-2.

Relative Entropy and Mutual Information; http://www.engineering.usu.edu/classes/ece/7680/lecture2/node3.html; print date Jun. 23, 2002; pp. 1-2.

(Continued)

*Primary Examiner*—Emmanuel L. Moise
*Assistant Examiner*—David J Pearson

(57) ABSTRACT

A device (120) processes traffic in a network. The device (120) obtains information corresponding to an activity between a group of source devices and one or more services of destination devices, measures, for each of the group of source devices, a behavior of the source activity in terms of independence and uniformity of access to the one or more services, and determines, for each of the group of source devices, whether the source activity includes probing based on the measured behavior. The device (120) also determines, for each of the group of source devices, a similarity factor representing a similarity between the source activity of one of the group of source devices and another of the group of source devices, compares the similarity factors for each pair of source devices to a threshold, and groups source devices when the similar factor for those source devices are below the threshold.

24 Claims, 7 Drawing Sheets

OTHER PUBLICATIONS

Entropy and Mutual Information; http://www-rocq.inria.fr/~gilles/IMMMI/entropy.html; print date Jun. 22, 2002; pp. 1-2.

Hannes Kruppa et al.; Mutual Information for Evidence Fusion; http://www.dai.ed.ac.uk/Cvonline/LOCAL_COPIES/KRUPPA1/cvonline.html; print date Jun. 22, 2002; pp. 1-5.

Martin Roesch; Snort—Lightweight Intrusion Detection for Networks; http://www.snort.org/docs/lisapaper.txt; print date Jun. 19, 2002; pp. 1-13.

James A. Hoagland et al.; Viewing IDS alerts: Lessons from SnortSnarf; Oct. 11, 2001; 14 pages.

* cited by examiner

PROBING REPORT 370

| SOURCE IP 510 | DIPs 520 | PORTS 530 | MAX H 540 | H 550 | U 560 | I 570 | HINT 580 |
|---|---|---|---|---|---|---|---|
| 00C.1 | 26.00 | 1.000 | 4.700440 | 4.700440 | 0.000000 | 0.000000 | 139 |
| 00B.1 | 1.000 | 193.0 | 7.592457 | 7.573622 | 0.018835 | 0.000000 | 00B.3 |
| 00C.2 | 1.000 | 18.00 | 4.169925 | 4.121530 | 0.048395 | 0.000000 | 00B.4.1.1 |
| 00C.3 | 1.000 | 19.00 | 4.247928 | 4.198845 | 0.049082 | 0.000000 | 00C.8 |
| 00C.4 | 1.000 | 19.00 | 4.247928 | 4.197944 | 0.049983 | 0.000000 | 00B.5 |
| 00C.5 | 60.00 | 1.000 | 5.906891 | 5.839200 | 0.067691 | 0.000000 | 53 |
| 00C.6 | 1.000 | 19.00 | 4.247928 | 4.156678 | 0.091249 | 0.000000 | 00B.6 |

FIG. 5

SYSTEMS AND METHODS FOR DETECTING NETWORK INTRUSIONS

GOVERNMENT CONTRACT

The U.S. Government has a paid-up license in this invention and the right in limited circumstances to require the patent owner to license others on reasonable terms as provided for by the terms of Contract No. F30602-98-C-0012 awarded by the Defense Advanced Research Projects Agency (DARPA).

FIELD OF THE INVENTION

The present invention relates generally to communications systems and, more particularly, to systems and methods for detecting malicious network activity.

BACKGROUND OF THE INVENTION

Network attacks represent a major threat to the continuous operation of network devices. The initial stages of a network attack may involve a source device "probing" or "scanning" a destination device to determine whether a particular network service (e.g., a database service that stores financial data or any other type of service that may be of interest to a network hacker) is operating and available on that destination device. In a malicious context, the source device may be attempting to identify the availability of a service that is vulnerable to exploitation. Although a source device may have knowledge of (possibly published) vulnerabilities associated with such services, in general, the source device has no advance knowledge of the location of these services (i.e., on what specific network devices these services are available). Hence, the source device must "probe" or "scan" network devices in order to locate these services.

Tools are widely available on the Internet to assist attackers in unauthorized probing of networks. The Network Mapper (Nmap) tool from www.insecure.org/nmap is one example. Nmap comes complete with a graphical user interface, which allows an attacker to easily customize his or her probing activities. Moreover, Nmap can be customized to probe at a specified rate (e.g., x probes per second).

Conventionally, probing is detected using rate-based techniques. That is, for the purposes of detection, a probe is defined in terms of "more than x connections (or connection attempts) in y second(s)." For example, the Snort pre-processor for detecting scans, known as spp portscan, is based upon an administrator-configurable detection specification of "x connection(s) per y second(s)." This type of detection technique has several serious drawbacks. First, the Snort pre-processor generates a myriad of false positives (e.g., benign usage of passive file transfer protocol communications, benign use of web service, etc.) and, therefore, can be quite inaccurate. Second, the Snort pre-processor misses true positives that occur below the specified threshold. For example, a source device that is scanning very slowly may avoid detection by operating below the detection threshold of the Snort pre-processor. Third, there is poor differentiation between false positives and true positives using this conventional detection technique, since all alerts and indications of potential scanning are reported as equal.

Conventional attack detection techniques, like the Snort pre-processor described above, often report anomalies in terms of an absolute score for a source device, making it difficult to discriminate between benign and malicious usage. For example, in the case of the conventional scan detection technique described above, the absolute score is binary (i.e., either a source device exceeded the probing threshold or did not). As another example, a source device may execute a highly unlikely event, such as contacting a new service (a rare event with respect to the typical usage pattern associated with all other source devices). Alternatively, in an environment such as a peering point, the frequent occurrence of new source devices may be reported as anomalous using conventional detection techniques, even though the appearance of new malicious source devices may occur no more or less frequently than the appearance of new benign source devices. These absolute measures confound the ability to adequately discriminate between malicious and benign sources.

In addition, conventional detection techniques often rely exclusively on the definition of attack signatures for subsequent detection of an attack. Such techniques are, therefore, incapable of detecting novel attacks, since they require an established pattern for comparison and detection. As a consequence, these techniques are heavily dependent on distribution channels, such as advisory organizations, to promulgate detection signatures. Therefore, there is often a period of inadequate protection between the appearance of an attack and the delivery (and development) of the corresponding detection signature. Typically, this delay is on the order of days and weeks, not minutes or hours, thus leaving an enterprise vulnerable for a repeat attack.

Therefore, there exists a need for systems and methods that improve the ability to detect malicious network activity.

SUMMARY OF THE INVENTION

Systems and methods consistent with the present invention address this and other needs by providing a mechanism that improves network security and enhances the ability to detect malicious network activity.

In accordance with the purpose of this invention as embodied and broadly described herein, a network intrusion device includes a memory and a processor. The processor is configured to receive information relating to an activity between a source device and one or more services of destination devices, measure a behavior of the source activity in terms of independence and uniformity of access to the one or more services, and identify probing based on the measured behavior.

In another implementation consistent with the present invention, a method for identifying similar network behavior is provided. The method includes receiving information corresponding to activity between a group of source devices and one or more services of a group of destination devices, determining, for each of the group of source devices, a behavior of the source activity, and grouping source devices based on the determined behavior of the activity for each of the respective source devices.

In yet another implementation consistent with the present invention, a method for processing traffic in a network is disclosed. The method includes obtaining information corresponding to an activity between a group of source devices and one or more services of destination devices; measuring, for each of the group of source devices, a behavior of the activity in terms of independence and uniformity of access to the one or more services; and determining, for each of the group of source devices, whether the activity includes probing based on the measured behavior. The method further includes determining, for each of the group of source devices, a similarity factor representing a similarity between the activity of one of the group of source devices and another of the group of source devices; comparing the similarity factors for each pair of source devices to a threshold; and grouping source devices when the similarity factor for those source devices are below the threshold.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 illustrates an exemplary probing report that may be generated by an intrusion detection device in an implementation consistent with the present invention;

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the present invention provide a security device for aiding in the detection of network intrusions. In a first implementation, an intrusion detection device identifies probing activity by measuring the behavior of a source activity in terms of independence/uniformity of access to network services. In a second implementation, the intrusion detection device identifies novel forms of malicious behavior by clustering sources of activity that exhibit similar behavior with respect to service usage.

Exemplary System

Figure 1:
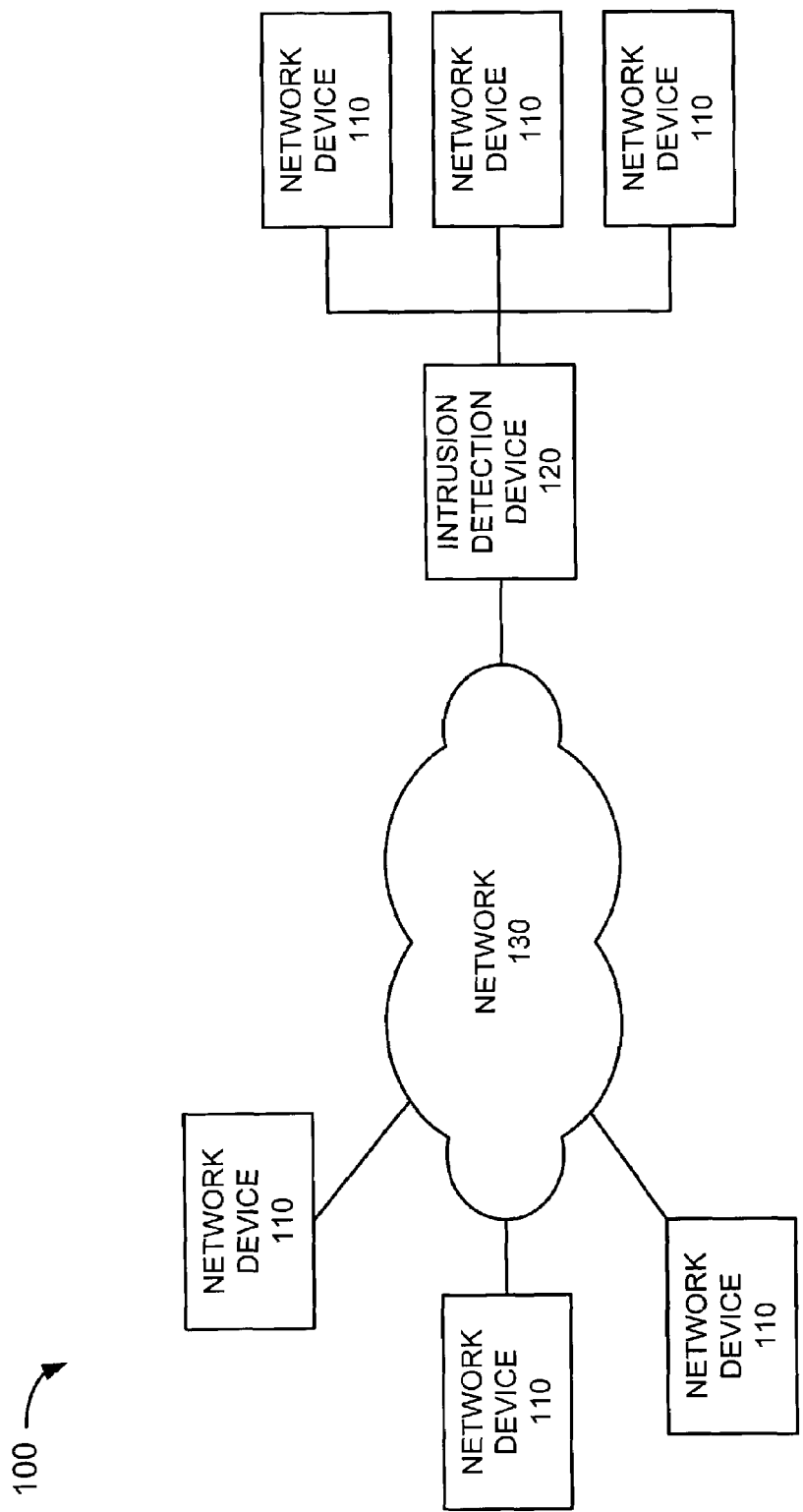
FIG. 1 illustrates an exemplary system in which systems and methods consistent with the present invention may be implemented.

FIG. 1 illustrates an exemplary system 100 in which systems and methods consistent with the present invention may be implemented. As illustrated, system 100 includes a group of network devices 110 and an intrusion detection device 120 that are interconnected via a network 130. A single intrusion detection device 120 and six network devices 110 are illustrated for simplicity. It will be appreciated that a typical system may include more or fewer intrusion detection devices 120 and network devices 110.

Network 130 may include one or more networks, such as the Internet, an intranet, a wide area network (WAN), a local area network (LAN), or another similar type of network. Network devices 110 may include any type of device that is capable of transmitting and receiving data via network 130, such as a server, personal computer, laptop computer, personal digital assistant, or the like. Network devices 110 may connect to network 130 via a wired, wireless, or optical connection.

Intrusion detection device 120 may include one or more devices, such as a high-end computer, a server or collection of servers, or the like, capable of identifying malicious network behavior. As will be described in detail below, intrusion detection device 120 may identify malicious behavior via one or both of the following procedures: (a) identifying probing by measuring the behavior of a source activity in terms of independence/uniformity of access to services, and (b) identifying novel forms of malicious behavior by clustering sources of activity that exhibit similar behavior with respect to service usage.

Figure 2:
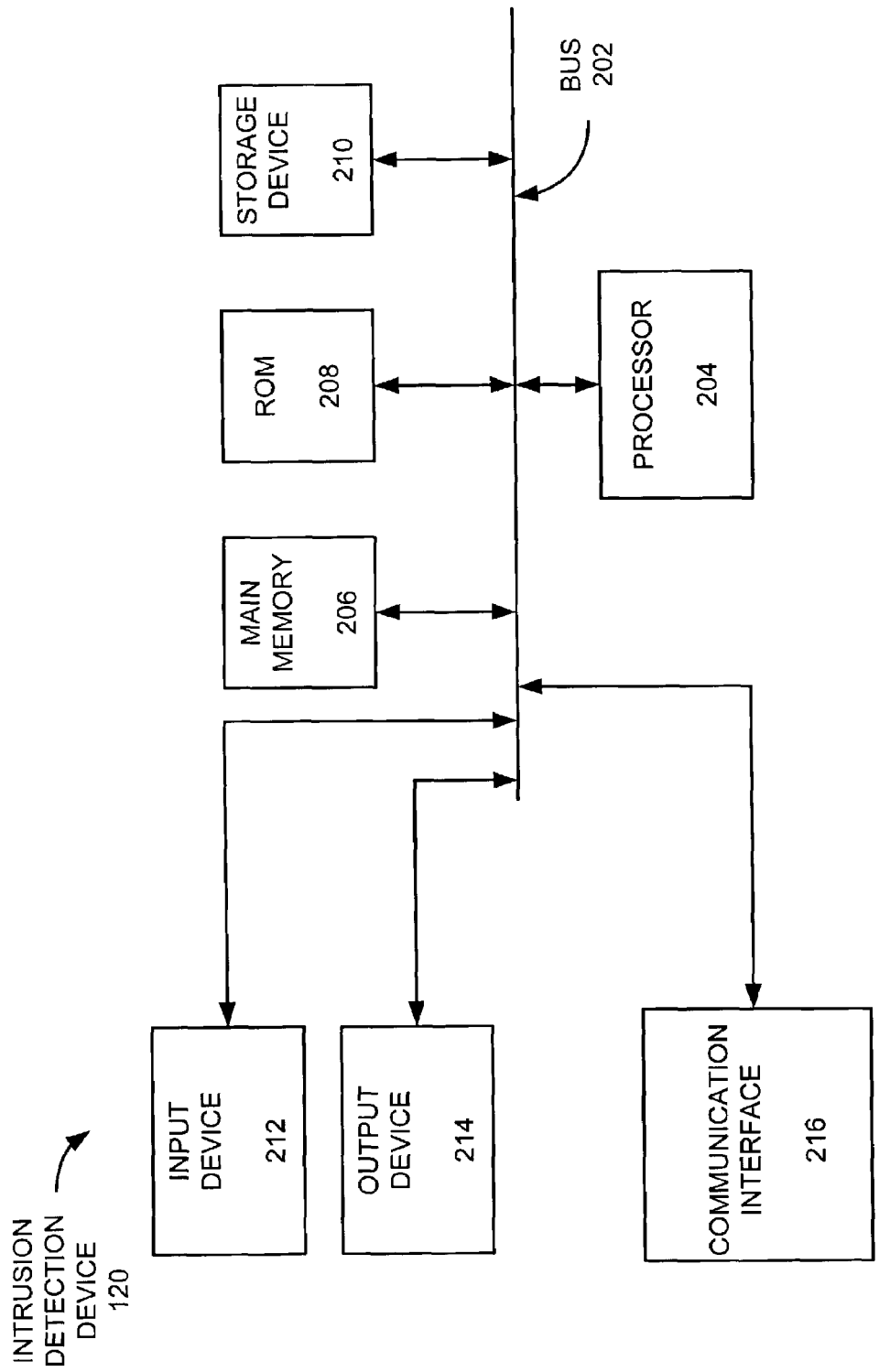
FIG. 2 illustrates an exemplary configuration of the intrusion detection device of FIG. 1.

FIG. 2 illustrates an exemplary configuration of intrusion detection device 120 of FIG. 1. As illustrated, intrusion detection device 120 may include a bus 202, a processor 204, a main memory 206, a read only memory (ROM) 208, a storage device 210, an input device 212, an output device 214, and a communication interface 216. Bus 202 permits communication among the components of intrusion detection device 120.

Processor 204 may include any type of conventional processor or microprocessor that interprets and executes instructions. Memory 206 may include a random access memory (RAM) or another dynamic storage device (referred to as main memory) that stores information and instructions for execution by processor 204. Main memory 206 may also be used to store temporary variables or other intermediate information during execution of instructions by processor 204.

ROM 208 may include a conventional ROM device and/or another static storage device that stores static information and instructions for processor 204. Storage device 210 may include a magnetic disk or optical disk and its corresponding drive and/or some other type of magnetic or optical recording medium and its corresponding drive for storing information and instructions.

Input device 212 may include one or more conventional mechanisms that permit an operator to input information to intrusion detection device 120, such as a keyboard, a mouse, a pen, one or more biometric mechanisms, such as a voice recognition device, etc. Output device 214 may include one or more conventional mechanisms that output information to the operator, such as a display, a printer, a speaker, etc. Communication interface 216 may include any transceiver-like mechanism that enables intrusion detection device 120 to communicate with other devices and/or systems, such as a network administrator device. For example, communication interface 216 may include a modem or an Ethernet interface to a network. Alternatively, communication interface 216 may include other mechanisms for communicating via a network.

Intrusion detection device 120 may implement the functions described below in response to processor 204 executing software instructions contained in a computer-readable medium, such as memory 206. A computer-readable medium may be defined as one or more memory devices and/or carrier waves. In alternative embodiments, hardwired circuitry may be used in place of or in combination with software instructions to implement the present invention. Thus, the present invention is not limited to any specific combination of hardware circuitry and software.

Figure 3:
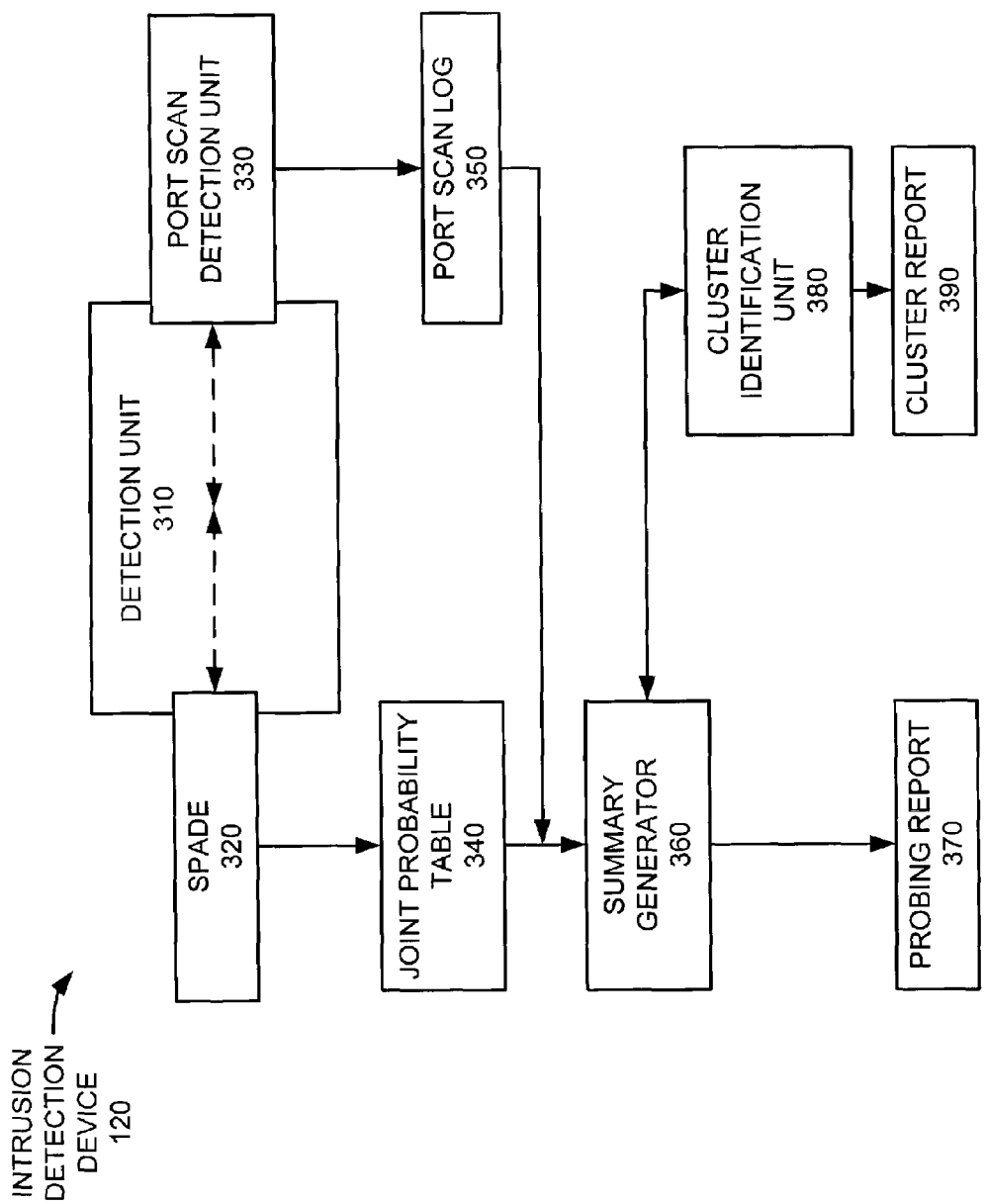
FIG. 3 illustrates an exemplary functional block diagram of the intrusion detection device of FIG. 1.

FIG. 3 illustrates an exemplary functional block diagram of intrusion detection device 120 of FIG. 1. As illustrated, intrusion detection device 120 includes a detection unit 310, having a statistical packet anomaly detection engine (SPADE) 320 and a port scan detection unit 330, a summary generator 360, and a cluster identification unit 380.

Detection unit 310 monitors traffic in network 130 and creates logs of the traffic detected based on a group of preset rules. It is assumed hereafter that detection unit 310 is implemented using the network intrusion detection system, Snort. It will be appreciated, however, that the present invention is equally applicable to other network intrusion detection systems.

SPADE 320 is a plug-in module for Snort system 310 that detects statistically anomalous packets that might indicate a port scan or other anomalous events. SPADE 320 creates a joint probability table 340 in a well-known manner based on each new connection between a source device and destination service observed within network traffic. Joint probability table 340 is indexed by the following identification information: source device, destination device, and destination port (i.e., the applicable service on the destination network device to which contact has been initiated by the source device). An entry in joint probability table 340, as indexed by the above information, records the ratio of the occurrence of a particular set of identification information to the total number of occurrences of all sets of identification information and thus represents a probability of occurrence for that set of identification information.

Port scan detection unit 330 is a plug-in module for Snort system 310 that detects traffic in network 130 having, for example, bad protocol flags. Port scan detection unit 330 creates a port scan log 350 in a well-known manner that lists the sources of the detected traffic.

Summary generator 360 collects the data from joint probability table 340 and port scan log 350 at predetermined intervals and, as will be described in greater detail below, processes this information to identify probing activities. Summary generator 360 provides a probing report 370 from which potentially malicious probing activity may be identified. Cluster identification unit 380 receives probing information from summary generator 360 and uses this information to cluster sources with similar behavior, which may represent potentially malicious behavior. Cluster identification unit 380 provides a cluster report 390 from which potentially malicious behavior may be identified based on similarity of activity.

Exemplary Processing

As described above, although a source activity may have knowledge of (possibly published) vulnerabilities associated with network services, in general, the source has no advance knowledge of the location of these services (i.e., on what specific network devices these services are available). Implementations consistent with the principles of the present invention presume that optimal discovery of such vulnerable services on the part of the attacker will tend toward independent, and most likely uniform, coverage of services during the course of a probe (i.e., the attacker will probe the same services independent of the network device on which it is hosted and will likely cover this space uniformly, for it would be both ineffective and inefficient (in terms of discovery) to probe one unavailable service more than any other).

Based upon the above presumptions, detection of probing activities can be improved by calculating both independence and uniformity factors for each source device, such that those source devices that exhibit both a high independence and uniformity factor are designated as the most likely sources of probing.

Figure 4:
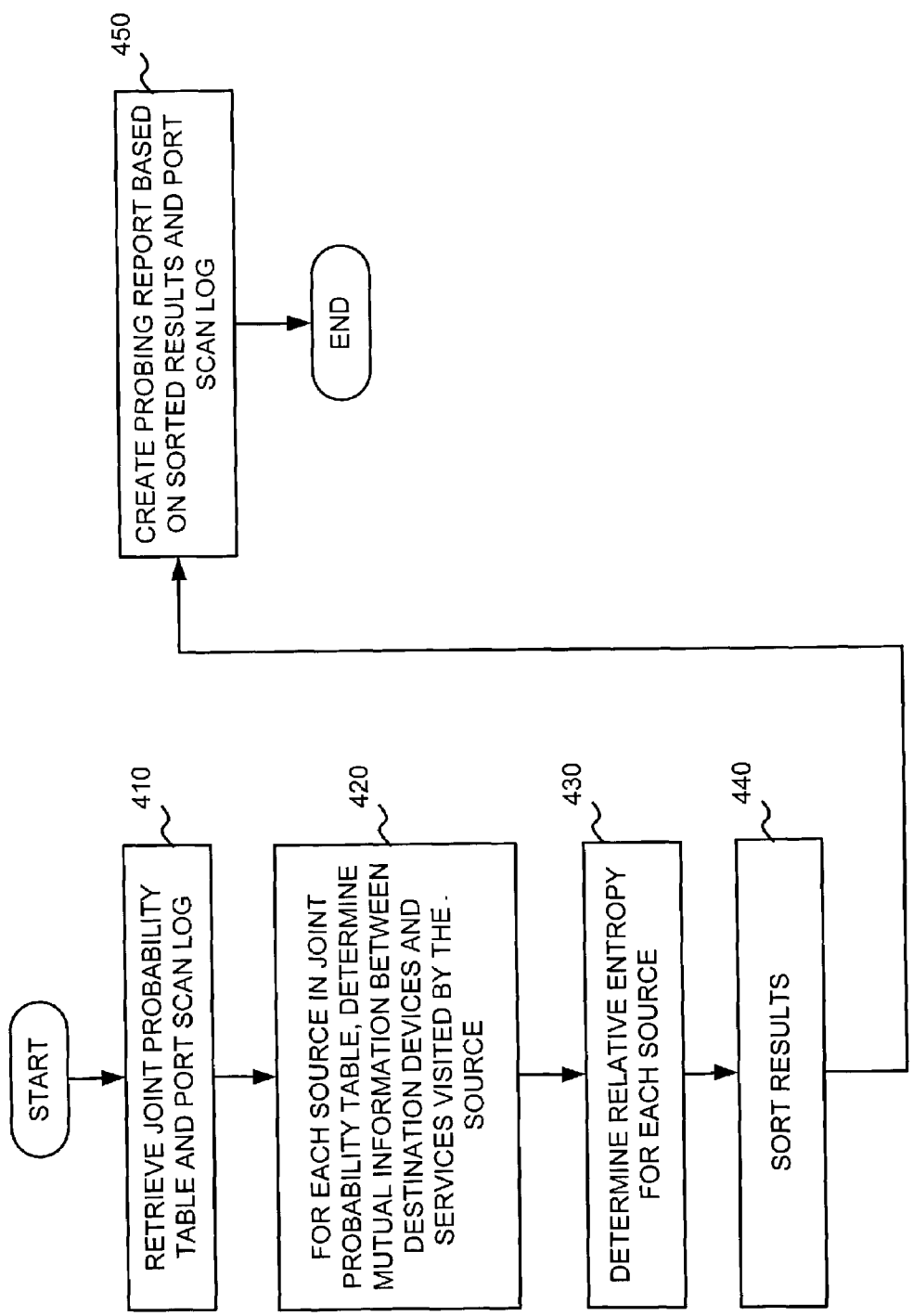
FIG. 4 illustrates an exemplary process for detecting probing activity in an implementation consistent with the present invention.

FIG. 4 illustrates an exemplary process for detecting probing activity in an implementation consistent with the present invention. Processing may begin with SPADE module 320 creating joint probability table 340 and port scan detection unit 330 creating port scan log 350 in a well-known manner. For example, SPADE module 320 and port scan detection unit 330 may create joint probability table 340 and port scan log 350, respectively, based on information derived from the transport layer (e.g., the TCP layer), such as by counting the occurrence of SYN packets as a measure of connection or connection attempts. SPADE module 320 may store joint probability table 340 in, for example, memory 206.

At predetermined intervals, summary generator 360 may retrieve joint probability table 340 and port scan log 350 from memory 206 [act 410]. Based on joint probability table 340, summary generator 360 may determine the following information per source device:

I(dip; dport), which represents the mutual information between the destination devices (dip) and the services (dport) visited by a source device [act 420], and D(q|u), which represents the relative entropy (or Kullback-Liebler distance) between q, the actual distribution among destination devices and services visited by a source device, and u, a uniform distribution (maximum entropy) among destination devices and services [act 430].

Techniques for determining the mutual information between two random variables are well-known in the art. Moreover, techniques for determining the relative entropy of two probability mass functions are also well-known in the art.

Assume, for example, that dip and dport are random variables with a joint distribution of p(dip, dport) and marginal distributions p(dip) and p(dport). The mutual information I(dip; dport) can be expressed as follows:

$$I(dip; dport) = \sum_{dip} \sum_{dport} p(dip, dport) \log \frac{p(dip, dport)}{p(dip)p(dport)}.$$

Similarly, the relative entropy of the probability mass functions q(x) and u(x) can be expressed as:

$$D(q|u) = \sum_{x \in X} q(x) \log \frac{q(x)}{u(x)}.$$

From these measures, the most likely sources of probing may be identified, namely, those sources with I and D values at or very near zero (I=D=0.0). That is, an I value of 0.0 signifies total independence between choice destination and choice of service on the part of the source device. Similarly, a distance of 0.0 from uniformity signifies that the actual distribution was also uniform.

Once the independence and uniformity values have been determined, summary generator 360 may sort the results by increasing independent value, I [act 440]. Other sorting techniques may alternatively be used. Summary generator 360 may create a probing report 370 based on the sorted results and any source devices identified in port scan log 350 as having, for example, bad protocol flags [act 450].

FIG. 5 illustrates an exemplary probing report 370 that may be generated by intrusion detection device 120 in an implementation consistent with the present invention. As illustrated, probing report 370 may include the following exemplary fields: a Source Internet Protocol (IP) field 510, a destination network device (DIPs) field 520, a destination network device services (Ports) field 530, a maximum entropy (Max H) field 540, an actual entropy (H) field 550, a uniformity of coverage (U) field 560, an independence of coverage (I) field 570, and a hint (Hint) field 580. It will be appreciated that probing report 370 may include additional fields (not shown) that may be of interest to a system administrator.

Source IP field 510 may display information identifying the source of the activity. In one implementation, the information may include an IP address. DIPs field 520 may display a value representing the number of destination network devices contacted by the source device identified in Source IP field 510.

Ports field 530 may display a value representing the number of services contacted (or ports visited) by the source device identified in Source IP field 510 on the destination network devices. Maximum entropy (Max H) field 540 may display a value representing the maximum entropy achievable if all destination network devices and services in fields 520 and 530 were covered uniformly by the source device identified in Source IP field 510. Actual entropy (H) field 550 may display a value representing the actual entropy coverage by the source device identified in the Source IP field 510. Uniformity of coverage (U) field 560 may display a value representing the distance from uniformity of coverage. Independence of coverage (I) field 570 may display a value representing the independence of coverage between choice of destination device and choice of service on the part of the source device identified in Source IP field 510. Hint field 580 may display information identifying a destination network device or service if only one destination network device or service was visited by the source device identified in Source IP field 510.

As an example, it is evident from probing report 370 (FIG. 5) that source device 00C.3 (Source IP 510) visited 19 ports (Ports 530) on one destination network device (DIP 520), namely 00C.8 (Hint 580), with an independence factor (I 570) of 0.0 and a very low distance from uniformity (U 560) of 0.049082. Due to the low independence (0.0) and uniformity (0.049082) factors, this source device is likely probing 19 ports on destination network device 00C.8.

Figure 6:
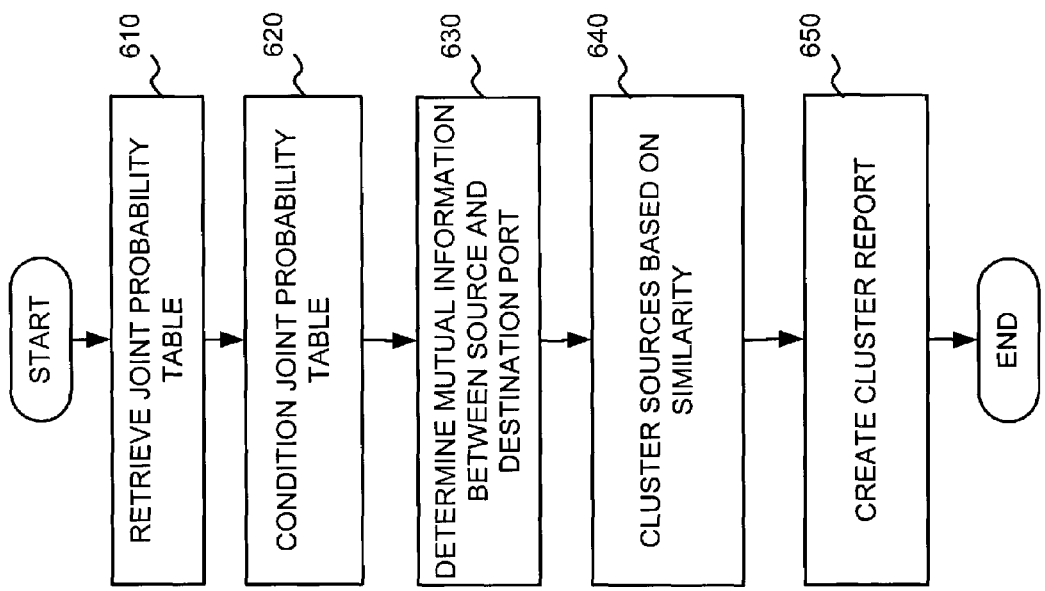
FIG. 6 illustrates an exemplary process for detecting malicious activity in a network in an implementation consistent with the present invention.

FIG. 6 illustrates an exemplary process for detecting malicious activity in a network in an implementation consistent with the present invention. As described above, conventional detection techniques generally report anomalies in terms of some absolute score for a source device, making it difficult to adequately discriminate between benign and malicious usage. Implementations consistent with the principles of the present invention determine anomalous behavior with respect to a given source device based upon the relative activity of the source device when compared to other source devices, not necessarily on the absolute anomaly associated with a given source device. As will be described in detail below, the present invention clusters sources with similar behavior in order to more effectively discriminate among malicious and benign activities. On the basis of attraction, it is determined that malicious activities attract other malicious activities of like behavior, and likewise for benign behaviors. The resulting clusters of sources then provide a context for discrimination. Each cluster represents a category or class of behavior and contains all sources that exhibit similar behavior.

In the present implementation, clustering of sources is based upon a pair-wise measurement of mutual information between a source and its service usage (independent of destination network device). Processing may begin with SPADE module 320 creating joint probability table 340 in a well-known manner. For example, SPADE module 320 may create joint probability table 340 based on information derived from the transport layer (e.g., the TCP layer), such as by counting the occurrence of SYN packets as a measure of connection or connection attempts. SPADE module 320 may store joint probability table 340 in, for example, memory 206.

At predetermined intervals, summary generator 360 may retrieve joint probability table 340 from memory 206 [act 610]. Based on joint probability table 340, given by p(source, destination, destination-port), summary generator 360 may condition joint probability table 340 such that p'=p(source, destination, destination-port|source=A or source=B), where A and B are the source devices under comparison, and p' is the new conditional probability distribution [act 620]. Summary generator 360 may then determine the mutual information between source device and destination port with respect to p' as follows:

I(source;destination-port) [act 630].

This calculation yields real values between 0.0 and 1.0, where a value of 0.0 means that the two sources are totally indistinguishable in their behavior (perfectly similar) and a value of 1.0 means that the two sources are completely distinguishable (perfectly dissimilar).

Cluster identification unit 380 receives this information from summary generator 360 and clusters source devices according to their similarity [act 640]. Since the mutual information calculation yields a continuum of values, it is necessary to introduce a threshold for determining whether to establish a cluster. In an implementation consistent with the principles of the present implementation, cluster identification unit 380 compares mutual information values to a user-definable threshold. Cluster identification unit 380 may cluster two given source devices whose computed value is at or below the threshold. Similarly, cluster identification unit 380 may segregate two given source devices whose computed value is strictly above the threshold. As a result, if a source device behaves like no other, cluster identification unit 380 establishes a singleton cluster for that source device. Cluster identification unit 380 may create a cluster report 390 based on the clusters identified [act 650]. This report 390 may be used to identify new attack signatures.

Figure 7:
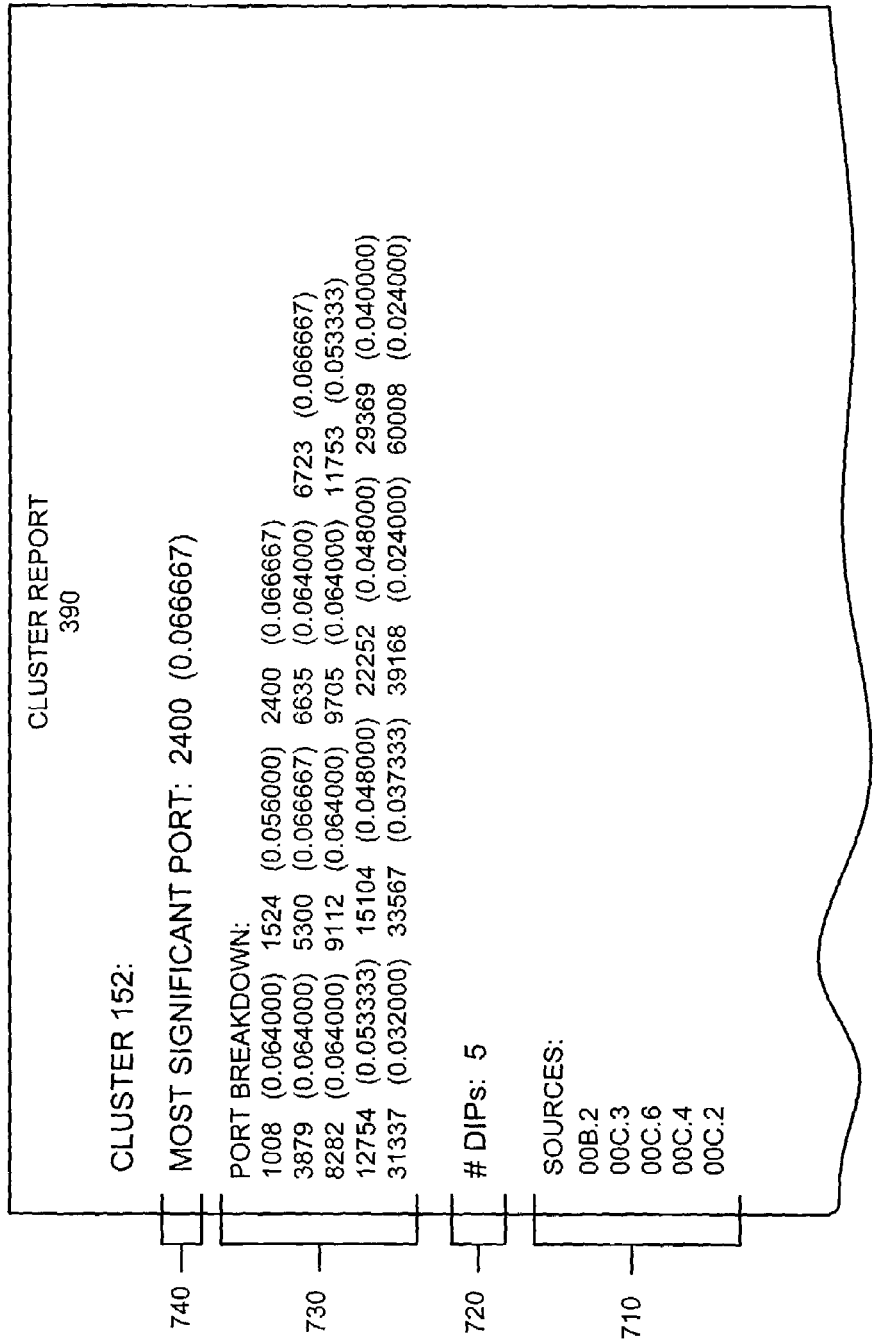
FIG. 7 illustrates an exemplary portion of a cluster report that may be generated by an intrusion detection device in an implementation consistent with the present invention.

FIG. 7 illustrates an exemplary portion of a cluster report 390 that may be generated by intrusion detection device 120 in an implementation consistent with the present invention. As illustrated, the cluster includes five sources 710, identified as 00B.2, 00C.2, 00C.3, 00C.4, and 00C.6. These sources had strong attraction for one another due to similarity in service usage and thus formed the cluster shown (i.e., cluster no. 152).

The cluster shown in FIG. 7 demonstrates the capability to identify novel attack signatures. FIG. 7 shows five different sources with highly similar service usage. According to FIG. 7, five destination devices (#DIPs) 720 were contacted according to the similarity of port usage frequencies illustrated in the port breakdown 730, with the most significant port being represented at 740. It is important to note that this cluster represents a malicious activity, and the present invention identified all sources perpetrating this activity without a priori knowledge. That is, the present invention discovered this novel attack without suggestion or programming.

The above-described cluster identification processing employs either simulated annealing or brute force comparison of sources, the choice of which is dependent on the number of sources to be clustered (simulated annealing for a large number of sources, brute force comparison for a relatively small number of sources). However, it will be appreciated that the clustering identification processing could be based upon methods unrelated to brute force comparison or simulated annealing, such as k-nearest neighbor techniques.

A unique and significant characteristic associated with the cluster identification processing is its capability to identify new signatures of malicious behavior. That is, the clustering processing described herein (based upon similarity of behavior) requires no a priori knowledge of an attack signature in order to classify the malicious behavior. As a result, there is minimal delay between the appearance of a new attack and the deployment of a corresponding attack signature for use in conventional attack prevention systems.

CONCLUSION

Systems and methods consistent with the present invention provide a security device for aiding in the detection of network intrusions. In a first implementation, an intrusion detection device detects probing activity based on information in a joint probability table. The intrusion detection device determines, for each source device in the joint probability table, mutual information between destination network devices and services visited by the source device. The intrusion detection device also determines relative entropy for each source device. Based on mutual information and relative entropy, the likelihood that a particular source device was performing probing can be determined. In another implementation consistent with the principles of the invention, an intrusion detection device detects malicious activity based on information in a joint probability table. The intrusion detection device conditions the probability table for comparing the activity of two source devices and determines mutual information between each source device and destination ports of network devices visited by the source device. Based on the mutual information, the intrusion detection device clusters source devices based on similarity. From these clusters, new signatures of malicious behavior may be identified.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above description focused on the joint probability table being derived from information in the transport layer (e.g., counting the occurrence of SYN packets as a measure of connections or connection attempts), other techniques may alternatively be used.

For example, the techniques described above can also be applied to inter-process communication between a source activity and destination service using TCP or User Datagram Protocol (UDP), but recording the number of packets exchanged rather than recording the number of SYNs observed. Likewise, implementations consistent with the principles of the invention can be applied to inter-process communication between a source activity and destination service using the Internet Control Message Protocol (ICMP) or application layer protocols, such as Simple Mail Transfer Protocol (SMTP). When using SMTP, it may be desirable to record in the joint probability table the number of mail messages transmitted rather than the number of connections or connection attempts made to a port since it is unlikely that a mail relay will behave uniformly in its delivery of mail messages (i.e., delivering the same number of messages to each next hop mail relay). This information could be used in better discriminating between those sources simply probing a particular port and those sources legitimately delivering mail.

The above implementations can be implemented in software, hardware, such as an application specific integrated circuit or a field programmable gate array, or a combination of software and hardware. Thus, the present invention is not limited to any specific combination of hardware circuitry and software.

While series of acts have been described with regard to FIGS. 4 and 6, the order of the acts may be varied in other implementations consistent with the present invention. Moreover, non-dependent acts may be implemented in parallel. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A network intrusion detection device comprising:
a memory configured to store instructions; and
a processor configured to execute the instructions to:
receive information relating to an activity between one of a plurality of source devices and one or more services of destination devices,
measure a behavior of activity of the one source device in terms of independence and uniformity of access to the one or more services, and
identify probing based on the measured behavior and not based on a priori knowledge of attack signatures by:
accessing a joint probability table comprising entries relating to connection or connection attempts by certain of said plurality of source devices, certain of said entries identifying said one source device, a destination device, and a destination service as a set of identification information, the joint probability table recording a ratio of occurrence of said set of said identification information to the total number of occurrences of all sets of said identification information thereby representing a probability of occurrence for said set of said identification information, and
clustering together with said one source device other of said plurality of source devices contributing to identification information having probability of occurrence similar to said probability of occurrence to obtain clustered source devices identified as probing devices from which a cluster report is created to identify new attack signatures.

2. The network intrusion detection device of claim 1 wherein the processor identifies probing when the source device activity is independent and uniform.

3. The network intrusion detection device of claim 1 wherein, when measuring the behavior of the source device activity, the processor is configured to:
determine mutual information between destination devices and services visited by the source device, and
determine relative entropy for the source device activity.

4. The network intrusion detection device of claim 3 wherein the processor identifies probing based on the mutual information and relative entropy for the source device activity.

5. The network intrusion detection device of claim 1 wherein the source device activity information is based on an inter-process communication between the source device and the one or more services using one or more of Transmission Control Protocol (TCP), User Datagram Protocol (UDP), Internet Control Message Protocol (ICMP), and an application layer protocol.

6. The network intrusion detection device of claim 5 wherein the source device activity information is based on an occurrence of SYN packets in the inter-process communication.

7. The network intrusion detection device of claim 5 wherein the source device activity information is based on a number of packets exchanged in the inter-process communication.

8. The network intrusion detection device of claim 1 wherein the source device activity information is based on an inter-process communication between the source device and the one or more services using Simple Mail Transfer Protocol (SMTP).

9. The network intrusion detection device of claim 1 wherein the processor is further configured to:
generate a report based on the identified probing.

10. The network intrusion detection device of claim 9 wherein the processor is further configured to:
receive information identifying sources of traffic including a bad protocol flag, and
wherein the processor further includes the identified sources in the report.

11. A method for identifying sources of probing in a communications network, comprising:
obtaining information corresponding to an activity between at least one source device and one or more services of destination devices;
measuring, for each source device, a behavior of the source device activity in terms of independence and uniformity of access to the one or more services; and
determining, for each of the at least one source devices, whether the source device activity comprises probing, the determining being based on the measured behavior and not based on a priori knowledge of attack signatures, the determining including:
accessing a joint probability table comprising entries relating to connection or connection attempts by certain of said source devices, certain of said entries identifying said one source device, a destination device, and a destination service as a set of identification information, the joint probability table recording a ratio of occurrence of said set of said identification information to the total number of occurrences of all sets of said identification information thereby representing a probability of occurrence for said set of said identification information, and
clustering together with said one source device other of said source devices contributing to identification information having probability of occurrence similar to said probability of occurrence to obtain clustered source devices identified as probing devices from which a cluster report is created to identify new attack signatures.

12. The method of claim 11 wherein the determining includes:
identifying the source device activity as probing when the source device activity is independent, and uniform.

13. The method of claim 11 wherein the measuring includes:
determining, for each source device, mutual information between destination devices and services visited by the source device, and
determining relative entropy for the source device activity.

14. The method of claim 13 wherein the determining whether the source device activity information comprises probing is based on the mutual information and relative entropy for the source device activity.

15. The method of claim 11 wherein the device activity information is based on an inter-process communication between the at least one source device and the one or more services using one or more of Transmission Control Protocol (TCP), User Datagram Protocol (UDP), Internet Control Message Protocol (ICMP), and an application layer protocol.

16. The method of claim 15 wherein the device activity information is based on an occurrence of SYN packets in the inter-process communication.

17. The method of claim 15 wherein the device activity information is based on a number of packets exchanged in the inter-process communication.

18. A network device comprising:
a memory configured to store instructions for controlling a processor to perform a method of creating a cluster report to identify new attack signatures by:
obtaining, via operation of first logic, information corresponding to activity between a plurality of source devices and one or more services of a plurality of destination devices;
determining, via operation of second logic, for each of the plurality of source devices, a behavior of the activity of that source device; and
clustering, via operation of third logic, source devices based on the determined behavior of the source activity of each of the plurality of source devices without a priori knowledge of attack signatures;
wherein, when obtaining the source device activity information:
the first logic is configured to retrieve data from a joint probability table including a plurality of entries, each entry including information identifying a source device, a destination device, and a service as a set of identification information, the joint probability table recording a ratio of occurrence of said set of said identification information to the total number of occurrences of all sets of said identification information thereby representing a probability of occurrence for said set of said identification information, and
the second logic is configured to determine the behavior of the source activity of a source device based on one or more entries in the joint probability table by conditioning the joint probability table for two or more source devices to be compared and determining mutual information between the two source devices and the one or more services to obtain a similarity factor, and
the third logic is configured to cluster together with said source device other of said plurality of source devices contributing to identification information having probability of occurrence similar to said probability of occurrence for which said similarity factor is below a configurable threshold to obtain clustered source devices identified as probing devices from which the cluster report is created to identify the new attack signatures.

19. A method for identifying similar network behavior, comprising:
receiving information corresponding to activity between a plurality of source devices and one or more services of a plurality of destination devices;
determining, for each of the plurality of source devices, a behavior of the activity of the source device by conditioning a joint probability table for two or more source devices to be compared and determining mutual information between the two source devices and the one or more services to obtain a similarity factor; and grouping the source devices based on the determined behavior of the activity for each of the respective source devices without a priori knowledge of attack signatures;

wherein the receiving includes retrieving data from the joint probability table including a plurality of entries, each entry including information identifying a source device, a destination device, and a service as a set of identification information, the joint probability table recording a ratio of occurrence of said set of said identification information to the total number of occurrences of all sets of said identification information thereby representing a probability of occurrence for said set of said identification information, and wherein the determining is based on one or more entries in the joint probability table, and wherein the grouping includes clustering together with said one source device other of said plurality of source devices contributing to identification information having probability of occurrence similar to said probability of occurrence for which the similarity factor is below a configurable threshold to obtain clustered source devices identified as probing devices from which a cluster report is created to identify new attack signatures.

20. A method for processing traffic in a network, comprising:

obtaining information corresponding to an activity between a plurality of source devices and one or more services of destination devices;

measuring, for each of the plurality of source devices, a behavior of the activity in terms of independence and uniformity of access to the one or more services;

determining, for each of the plurality of source devices, whether the activity comprises probing, the determining being based on the measured behavior and not based on a priori knowledge of attack signatures;

determining, for each of the plurality of source devices, a similarity factor representing a similarity between the activity of one of the plurality of source devices and another of the plurality of source devices;

comparing the similarity factors for each pair of source devices to a threshold; and grouping source devices when the similarity factor for those source devices are below the threshold;

wherein said method further comprises:

accessing a joint probability table comprising entries relating to connection or connection attempts by certain of said plurality of source devices, certain of said entries identifying said one source device, a destination device, and a destination service as a set of identification information, the joint probability table recording a ratio of occurrence of said set of said identification information to the total number of occurrences of all sets of said identification information thereby representing a probability of occurrence for said set of said identification information, and clustering together with said one source device other of said plurality of source devices contributing to identification information having probability of occurrence similar to said probability of occurrence to obtain clustered source devices identified as probing devices from which a cluster report is created to identify new attack signatures.

21. The method of claim 20 wherein the threshold is configurable.

22. A system for processing traffic in a network, comprising:

a memory configured to store instructions for controlling a processor to perform a method of:

obtaining information corresponding to an activity between a plurality of source devices and one or more services of destination devices;

calculating, for each of the plurality of source devices, a behavior of the source activity in terms of independence and uniformity of access to the one or more services;

determining, for each of the plurality of source devices, whether the source activity comprises probing, operation of the determining means being based on the measured behavior and not based on a priori knowledge of attack signatures by accessing a joint probability table comprising entries relating to connection or connection attempts by certain of said plurality of source devices, certain of said entries identifying said one source device, a destination device, and a destination service as a set of identification information, the joint probability table recording a ratio of occurrence of said set of said identification information to the total number of occurrences of all sets of said identification information thereby representing a probability of occurrence for said set of said identification information;

determining, for each of the plurality of source devices, a similarity factor representing a similarity between the source activity of one of the plurality of source devices and another of the plurality of source devices;

comparing the similarity factors for each pair of source devices to a threshold; and clustering source devices by clustering together with said one source device other of said plurality of source devices contributing to identification information when the similarity factor for those source devices is below the threshold to obtain clustered source devices identified as probing devices from which a cluster report is created to identify new attack signatures.

23. A computer-readable storage medium containing instructions for controlling one or more processors to perform a method for identifying probing in a network, comprising:

obtaining information corresponding to an activity between at least one source device and one or more services of destination devices;

determining, for each of the at least one source devices, a behavior of the activity in terms of independence and uniformity of access to the one or more services; and determining, for each of the at least one source devices, whether the activity comprises probing, the probing activity determining being based on the behavior and not based on a priori knowledge of attack signatures and being obtained by:

accessing a joint probability table comprising entries relating to connection or connection attempts by certain of said plurality of source devices, certain of said entries identifying said one source device, a destination device, and a destination service as a set of identification information, the joint probability table recording a ratio of occurrence of said set of said identification information to the total number of occurrences of all sets of said identification information thereby representing a probability of occurrence for said set of said identification information, and clustering together with said one source device other of said plurality of source devices contributing to identification information having probability of occurrence similar to said probability of occurrence to obtain clustered source devices identified as probing devices from which a cluster report is created to identify new attack signatures.

24. A computer-readable storage medium containing instructions for controlling one or more processors to perform a method for identifying similar network behavior, comprising:

obtaining information corresponding to activity between a plurality of source devices and one or more services of a plurality of destination devices;

determining, for each of the plurality of source devices, a behavior of the activity of the source device; and clustering source devices based on the determined behavior of the activity for each of the respective source devices and not based on a priori knowledge of attack signatures;

wherein the obtaining includes retrieving data from a joint probability table including a plurality of entries, each entry including information identifying a source device, a destination device, and a service as a set of identification information, the joint probability table recording a ratio of occurrence of said set of said identification information to the total number of occurrences of all sets of said identification, information thereby representing a probability of occurrence for said set of said identification information, and wherein the determining is based on one or more entries in the joint probability table, aid wherein the clustering includes clustering together with said one source device other of said plurality of source devices contributing to identification information having probability of occurrence similar to said probability of occurrence to obtain clustered source devices identified as probing devices from which a cluster report is created to identity new attack signatures.

* * * * *